UNITED STATES PATENT OFFICE.

CARL F. LEIDHOLDT, OF NEILLSVILLE, WISCONSIN, ASSIGNOR OF ONE THIRD TO HERRMAN SCHUSTER, OF SAME PLACE.

ARTIFICIAL STONE.

SPECIFICATION forming part of Letters Patent No. 254,342, dated February 28, 1882.

Application filed January 11, 1882. (No specimens.)

*To all whom it may concern:*

Be it known that I, CARL FRIEDERICH LEIDHOLDT, of Neillsville, in the county of Clark and State of Wisconsin, have invented a new and Improved Artificial Stone, of which the following is a full, clear, and exact description.

The object of my invention is to furnish a new and improved artificial stone or brick to be used for building purposes.

My improved composition of matter consists of the following ingredients, combined in the proportions stated: hydraulic lime, one part; clear sharp sand, two parts; leached wood or coal ashes, one-half part; glue-water and bone-meal in sufficient quantities to give the mass such consistency that it can be molded.

The ingredients are mixed as follows: The lime is slaked until it is completely pulverized and is then formed into paste by adding water. Then the glue-water, and, if desired, also the paint or coloring-matter. is added. I then add the bone-meal, sand, and ashes, and all the ingredients are thoroughly mixed to form a mortar.

Bone-meal consists of animal bones burned in an oven and ground to powder or meal; and the object of this bone-meal is to bind the mass and accelerate drying and hardening of the mass. Bone-meal generally is only to be used in making large stones, and the quantity of bone-meal required depends entirely upon the quality of the lime used.

I dissolve one pound of glue in twenty-four (24) cubic feet of water for obtaining the glue-water required. The object of the glue-water is to bind the particles and to accelerate drying and hardening, and it is only to be used for the smaller sizes of the stone.

The bricks or stones are molded in cast-iron molds, and are subjected to great pressure—for instance, twenty (20) tons—on the entire surface of the stone in a suitable press. After being pressed the bricks are removed from the press and placed in the drying-sheds. Large stones must remain in the molds a few days, and are then placed in the drying-sheds until they have become hardened sufficiently for use. The bricks or stones can be colored, as may be desired, by adding the necessary color to the mixture.

The stones or bricks are impervious to water. If partition-walls, &c., are built of my improved bricks, the hard-finish can be applied direct on the wall, and lathing and plastering can be dispensed with.

Having thus described my invention, what I claim as new, and desire to secure by Letters Patent, is—

As an improved article of manufacture, an artificial stone composed of hydraulic lime, sand, leached ashes, glue-water, and bone-meal in the proportions stated.

CARL FR. LEIDHOLDT.

Witnesses:
J. A. PARKHURST,
CARL STANGE.